Sept. 15, 1953  O. W. HOSKING  2,652,067
RUBBER TIRE VALVE
Filed Nov. 21, 1947
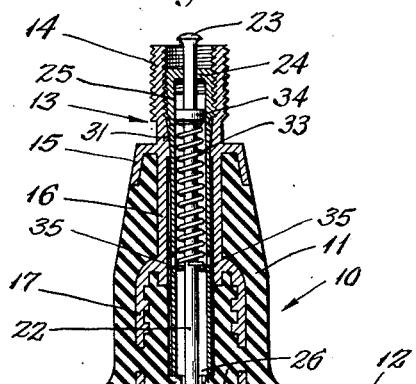
INVENTOR
Oakley W. Hosking
BY
Johnson and Kline
ATTORNEYS

Patented Sept. 15, 1953

2,652,067

UNITED STATES PATENT OFFICE 2,652,067

RUBBER TIRE VALVE

Oakley W. Hosking, Monroe, N. Y.

Application November 21, 1947, Serial No. 787,458

9 Claims. (Cl. 137—223)

This invention relates to valves for inflatable articles such as tubes of automobile tires, and more particularly to valves having stems formed of molded rubber, and having removable insides or cores including valve members cooperable with portions of the stems.

The present invention concerns improvements in the valve disclosed in my Patent #2,390,026 entitled "Valve Stem," issued November 27, 1945.

An object of the invention is to provide an improved valve core and stem of the type wherein the stem has an internal resilient annular shoulder in its bore providing a valve seat, the said core and stem being so arranged that the valve seat is securely backed up by the core and prevented from spreading and consequent failure, and the stem also being adapted for use with conventional type valve cores or insides which are not cooperable with the valve seat.

A further object of the invention is to provide an improved, reliable resilient molded rubber valve stem having a metal guard ferrule at its outer end, which is so constructed as to provide for added economy in manufacture.

Still another object of the invention is to provide an improved valve core of the type cooperable with a valve seat in a stem, which core is constructed to provide for maximum economy in manufacture while at the same time retaining reliability.

In accomplishing these objects there is provided by the invention a valve stem having a resilient annular shoulder in its bore providing a valve seat, and a special valve core removably secured in the stem and including a valve engageable with one side of said shoulder, the said core having a rigid annular portion which is engageable with the other side of the shoulder to provide a backing therefor. By this organization it is possible to advantageously locate the resilient valve seat of the stem closely adjacent the base or flange of the stem so as to be cooperable with and yet not interfere with valve cores of the conventional type; when, however, the valve stem is used with the special core, the valve seat, due to the backing or reinforcement provided, is prevented from spreading in response to air pressure on the valve, and thereby is proof against failure under severe conditions of use.

The valve core is secured to the valve stem, as usual, by being threaded into a tubular metal insert which is molded in the stem and which surrounds the bore thereof. Heretofore, a metal skirt or ferrule was formed integral with the metal insert and arranged to enclose the end of the resilient body constituting the valve stem, to provide a more sturdy construction. However, the use of an integral skirt required that stock of relatively great diameter be employed in the making of the insert, and also required a more lengthy machining operation, since more material had to be removed from the bar stock. By the present invention the metal skirt is made as a separate piece and provided with a novel shape to produce an interlocking engagement with the stem, and a novel organization is provided for holding the separate metal skirt in position with respect to the metal insert during the molding operation. The metal skirt has inwardly extended flanges which interlockingly engage the molded stem and securely anchors the skirt to the stem against removal. By this organization the fabrication of the metal insert for the stem is simplified considerably and made more economical, the combined cost of the separate skirt and insert being less than the cost of prior type inserts wherein the skirts are formed integral therewith.

The removable core for the valve stem is formed of a simple tubular metal piece in which the valve member is slidably carried. In one form of the invention a coiled compression spring is located in the tubular metal piece and the latter is provided with lanced fingers which extend inwardly and engage one end of the spring, thereby providing an extremely economical abutment means for the spring. In another form of the invention the valve spring is dispensed with entirely and a modified shape of valve provided to utilize the air pressure to seat the valve, in which event the tubular metal piece is devoid of projections in its bore, thereby resulting in a further economy in the fabrication of the piece.

Other features and advantages will hereinafter appear.

In the accompanying drawings:

Figure 1 is an axial sectional view, enlarged, of a valve core and valve stem made in accordance with the invention.

Fig. 2 is an elevational view of the valve core of Fig. 1.

Fig. 3 is a view like Fig. 1 but showing a conventional type of valve core mounted in the valve stem.

Fig. 4 is an axial view of a valve stem insert, guard ferrule and mold core pin made in accordance with the invention.

Fig. 5 is a sectional view of the insert and core pin of Fig. 4 mounted in a mold and embedded in a molded rubber body, and Fig. 6 is an axial sectional view of a valve core or insert illustrating a modification of the invention.

Referring to Figs. 1 and 2, the improved valve structure of the present invention comprises a body 10 having a tubular stem portion 11 and integral therewith a mounting flange 12. Preferably the body 10 is molded of resilient rubber, by the use of an appropriate core pin as disclosed in my patent above referred to.

Embedded in the body 10 is a rigid metal insert 13 which is of generally tubular form, having an internally and externally threaded top portion 14, having an integral protecting skirt 15 encompassing the top end of the stem portion 11, and having a main or body portion 16 located within the stem portion 11.

The lower part 17 of the insert 13 is of enlarged diameter and has internal ribs and grooves as shown, and also apertures in its walls, and the said lower part is substantially wholly surrounded by the rubber of the body and extends almost to the lower end or surface 18 of the body. By this construction it is seen that the body 10 has an inner portion 19 extending internally of the lower portion 17 of the insert 13, and that the said interior portion 19 of the body and the main portion 16 of the insert have bores aligned with each other, providing a through-passage through the stem portion 11.

Near the lower portion or flange of the body 10 the bore thereof is provided with a constriction 20 forming an internal annular shoulder, the lower face of which is adapted to function as a valve seat. For cooperation with the shoulder 20 a bulbous valve 21 is provided, carried at the lower extremity of a valve pin 22 which extends through the aligned bores of the body 10 and insert 13. The upper end 23 of the valve pin 22 is headed as shown and the pin has a sliding bearing in an upper end wall 24 of a tubular member 25 which has external threads cooperable with the internal threads of the insert portion 14. The valve 21, valve pin 22 and tubular member 25 constitute the valve core, designated "C," these parts being joined together against separation in a single assembly and being removable as a unit from the insert 13 by unscrewing.

The constriction or shoulder 20 of the body 10 is resilient, and when the valve core is inserted in the body the valve 21 may be forced downward through the constriction to the operative position shown in Fig. 1, the constriction expanding or spreading to enable this to be done.

In accordance with the present invention an improved means is provided for backing up the shoulder 20 to prevent the latter from expanding under the action of air pressure on the valve 21, the said means insuring against failure of the valve at all times that it is in use. This backing-up of the shoulder 20 is accomplished by extending the tubular member 25 of the valve core so that the lower end 26 of the member engages the upper face 27 of the shoulder, which face is opposite to the lower face forming the valve seat. Also, the shoulder 20 is formed so that at least a portion of the upper face thereof, and preferably the entire upper face, is disposed at right angles to the axis of the bore of the body 10. According to the invention, the shoulder 20 is also so located and shaped that it will cooperate with the depending members 28 of a conventional valve core 29 to enable such core to be used in conjunction with the body 10 and insert 13 if desired. As seen in Fig. 3, the conventional valve core 29 is threaded into the insert 13, the cup-like spring abutment 30 of the valve core resting against the upper surface 27 of the shoulder 20. Thus, the abutment 30 of the valve core is backed up by the shoulder 20, enabling the valve spring of the core to function in the usual manner. It will be noted that the internally extending portion 19 of the body 10 has a bore which is sufficiently large to enable clearance to exist between the depending members 28 of the conventional valve core 29, thereby to enable air to pass upwardly through the aligned bores and through the body of the valve core. The bore of the tubular insert 13 is provided with a taper 31 for cooperation with either the tubular member 25 of the valve core C shown in Fig. 1, or the tubular member 32 of the valve core 29 shown in Fig. 3, whereby an airtight connection is provided.

Referring to Figs. 1 and 2, the valve core C has a compression spring 33 carried by the valve pin 22 and at one end engaging a collar 34 on the valve pin so that the latter may be normally yieldably held in an uppermost position as shown, maintaining the valve 21 against the seat provided by the constriction or shoulder 20. According to the invention improved means are provided for engagement with the lower end of the valve spring 33 to provide an abutment therefore, whereby the cost of the valve core C is materially reduced due to the simplified construction of the tubular member 25 of the core. This means comprises a pair of fingers 35 which are lanced from the wall of the tubular member 25 and which project inwardly into the bore thereof for engagement with the spring, as shown in Figs. 1 and 2.

I have found that a further simplification of the valve core C may be effected to reduce the cost thereof still more, by eliminating the collar 34 on the valve pin 22, and by eliminating the valve spring 33 and also the lanced fingers 35. In accomplishing this, a core C' is provided, as shown in Fig. 6, having a smooth-bored tubular member 25a. With this construction the pressure of the air on the underside of the valve 21a is such as to replace the action of the spring 33. Preferably the lower face 21b of the valve 21a is made hemispherical or substantially so rather than conical, to increase the effectiveness of the air pressure in supplanting the spring 33.

In accordance with the invention a simplified and less expensive insert is provided for the body 10, in conjunction with a separate guard skirt for encompassing the upper end of the body, thereby to further reduce the cost of the valve structure. In accomplishing this, as shown in Figs. 4 and 5, a tubular insert 36 is provided which has a substantially cylindrical outer surface devoid of any projections. The top portion 37 of the insert 36 is internally and externally threaded, and below the internal threads a tapered bore 38 is provided to enable a seal to be had with a valve core. The lower end 39 of the insert 36 has apertures 40 in which portions of the body 10 are disposed after the molding operation, thereby to provide an interlocking engagement between the insert and the body. A separate skirt or ferrule 41 is provided, the said ferrule having inturned flanges 42 and 43 at its opposite ends respectively and the internal diameter of the flange 43 being substantially greater than the outside diameter of the insert 36. The inside diameter of the flange 42 of the ferrule 41 is preferably such as to provide press-fit on the insert 36, or substantially a press fit.

To enable the body 10 to be molded about the insert 36 and within the ferrule 41, a novel core pin 44 is provided, comprising a body portion 45 having at one end an extension 46 shaped to produce the desired shoulder 20 in the body 10, the other end of the core pin having an extension 47 threaded at its base and carrying a knurled nut 48. The nut 48 holds in place a collar 49 having an inturned flange 50 interposed between the nut and the upper end portion 37 of the insert 36. The collar 49 extends downward, as viewed in Fig. 4, and terminates in an outturned flange 51 engaging the flange 42 of the ferrule 41 and acting as an abutment for the said ferrule.

Referring to Fig. 5, prior to the molding operation the core pin 41 is positioned in a mold part 52, the collar 49 closely fitting a bore 53 in the mold part and the flange 51 of the collar engaging and being positioned by a shoulder 54 of the mold part. The core pin 41 extends upward within the mold part as viewed in Fig. 5 and the extension 46 thereof engages a cooperable mold part 55. The mold parts 52 and 55 are shaped to provide a cavity having the form of the body 10, and when rubber material is molded in the cavity between the parts 52 and 55 the material will be forced inside of the ferrule and around and also inside the insert 36 except for the internally threaded portion thereof and tapered portion 38, all as shown in Fig. 5.

Variations and modifications may be made within the scope of this invention and portions of the improvements may be used without others.

I claim:

1. A valve structure comprising a tubular body having an integral resilient annular shoulder in its bore providing a valve seat; a valve core insertable in said body, including a valve engageable with one side of said shoulder, and including a rigid annular member engageable with the other side of the shoulder to provide a non-yielding backing therefor; to limit yielding of the shoulder to an extent to prevent passage of the valve thereby; and threaded means for mounting the valve core in the body for removal therefrom to disengage the member from the shoulder to permit the shoulder to yield and pass the valve by the shoulder.

2. A valve structure comprising a tubular body having an integral resilient annular shoulder in its bore, one face of said shoulder providing a valve seat and the other face of the shoulder having a portion disposed substantially normal to the axis of said bore; a sleeve secured to said body; and a valve core detachably secured in said sleeve, including a valve engageable with the valve seat and a rigid annular portion threaded into the sleeve and engageable with the other face of the shoulder to provide a non-yielding backing for the shoulder to limit yielding of the shoulder to an extent to prevent passage of the valve thereby, said rigid annular portion being movable out of engagement with the shoulder to permit the shoulder to yield and the valve pass thereby.

3. A valve structure comprising a resilient tubular rubber body having an integral annular shoulder in its bore providing a valve seat; a metal insert in said body, embedded in the portion of the body surrounding the said shoulder to limit circumferential expansion of the shoulder; a valve core insertable in said body, including a valve engageable with one side of said shoulder, and including a rigid annular member engageable with the other side of the shoulder to provide a non-yielding backing therefor; and means for removably securing the valve core in said body.

4. A valve structure comprising a resilient tubular rubber body having an integral annular shoulder in its bore providing a valve seat; means carried by the body and surrounding a portion of the body adjacent the said shoulder to limit circumferential expansion of the shoulder; a valve core insertable in said body, including a valve engageable with one side of said shoulder, and including means engageable with the other side of the shoulder to provide a non-yielding backing therefor; and means for removably securing the valve core in said body.

5. A valve structure comprising a tubular body having an integral resilient annular shoulder in its bore providing a valve seat; a valve core insertable in said body, including a valve engageable with one side of said shoulder, and including a metal tube and means slidably mounting the valve on the tube, one end of said tube being engageable with the other side of the shoulder to provide a non-yielding backing therefor to limit yielding of the shoulder to an extent to prevent passage of the valve thereby; and threaded means for removably securing the metal tube in said body in backing position and for enabling the tube to be moved out of backing position to permit the valve to pass the shoulder.

6. A valve structure comprising a resilient tubular rubber body having an integral annular shoulder in its bore providing a valve seat; an internally threaded tubular metal insert in said body, having a bore aligned with the bore of the body; a valve core insertable in said bores of the insert and body, including an externally threaded tube screwable in said insert whereby the end of the tube may be engaged with one side of the annular shoulder to provide a non-yielding backing therefor, and said core including a valve engageable with the other side of the shoulder to halt the flow of air through the said bores.

7. A valve structure comprising a resilient tubular rubber body having an integral annular shoulder in its bore providing a valve seat; an internally threaded tubular metal insert in said body, having a bore aligned with the bore of the body; a valve core insertable in said bores of the insert and body, including an externally threaded tube screwable in said insert whereby the end of the tube may be engaged with one side of the annular shoulder to provide a non-yielding backing therefor, and said core including a valve engageable with the other side of the shoulder to halt the flow of air through the said bores, said insert surrounding a portion of the rubber body adjacent said shoulder to limit circumferential expansion of the shoulder.

8. A valve structure comprising a resilient rubber body having a tubular stem portion and an integral annular, outwardly extended rubber flange at the lower end of the stem portion; a rigid tubular insert extending into said body from the top of the stem portion almost to the lower surface of said body, said insert and body having passages forming aligned bores and providing a single passage through the stem, said insert having fastening means cooperable with a valve core for positioning the core in said single passage, a portion of said rubber body extending interiorly and axially of the insert from its lower end to a point below said fastening means, a part of the bore through said interiorly extending portion being substantially the same size, for a distance below its upper end, as the passage of the insert and said bore being constricted at the lower end of said portion to provide an upper face and a downwardly facing valve seat formed by the lower face of said constriction; and a valve core detachably secured in said body to said fastening means, said core including a valve engageable with the said downwardly facing valve seat, and including a rigid annular member engageable with said upper face of the constriction to provide a non-yielding backing therefor.

9. A valve structure comprising a tubular stem formed of resilient rubber; a rigid tubular insert extending into said stem from the top thereof almost to the bottom, said insert and stem having passages forming aligned bores and providing a single passage through the stem, said insert having fastening means cooperable with a valve core for positioning the core in said single passage, a portion of said stem extending interiorly of the insert from its lower end to a point below said fastening means and having a bore, an upper part of which is of substantially the same size as the passage of the insert and a lower part of which is constricted to provide an upper face and a downwardly facing valve seat formed by the lower face of the constriction; and a valve core detachably secured in said insert to the fastening means thereof, said core including a valve engageable with said downwardly facing valve seat, and including a metal tube the lower end of which engages the said upper face of the constriction to provide a non-yielding backing therefor.

OAKLEY W. HOSKING.

References Cited in the file of this patent

UNITED STATES PATENTS

| Number | Name | Date |
|---|---|---|
| 635,661 | Cole | Oct. 24, 1899 |
| 693,991 | Barrett | Feb. 25, 1902 |
| 1,862,160 | Preston | June 7, 1932 |
| 2,094,264 | Crowley | Sept. 28, 1937 |
| 2,188,713 | Gora | Jan. 30, 1940 |
| 2,232,530 | Hosking | Feb. 18, 1941 |
| 2,240,129 | Broecker | Apr. 29, 1941 |
| 2,243,930 | Watson | June 3, 1941 |
| 2,255,932 | Kraft | Sept. 16, 1941 |
| 2,260,646 | Sorokin | Oct. 28, 1941 |
| 2,276,502 | McCoy | Mar. 17, 1942 |
| 2,300,498 | Goff | Nov. 3, 1942 |
| 2,308,952 | Ickes | Jan. 19, 1943 |
| 2,361,890 | Watson | Oct. 31, 1944 |
| 2,424,802 | Crowley | July 29, 1947 |